Nov. 12, 1968  W. S. GORTON, JR  3,410,738
METHOD OF MAKING COILS OF ELECTRICAL CONDUCTORS
Filed Jan. 18, 1965  2 Sheets-Sheet 1

INVENTOR
William S. Gorton, Jr.
BY
Alex Mich, Jr.
ATTORNEY

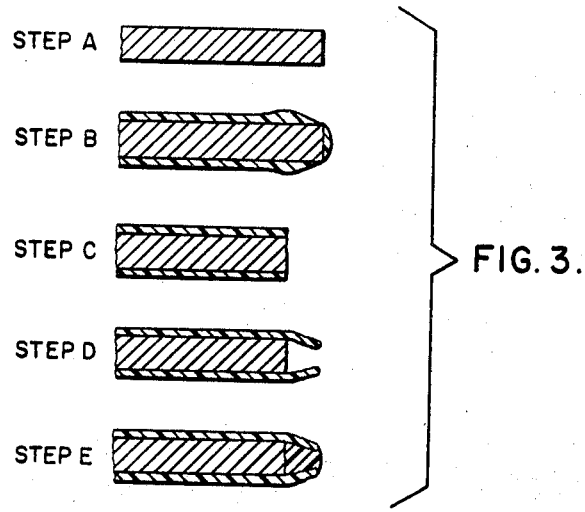
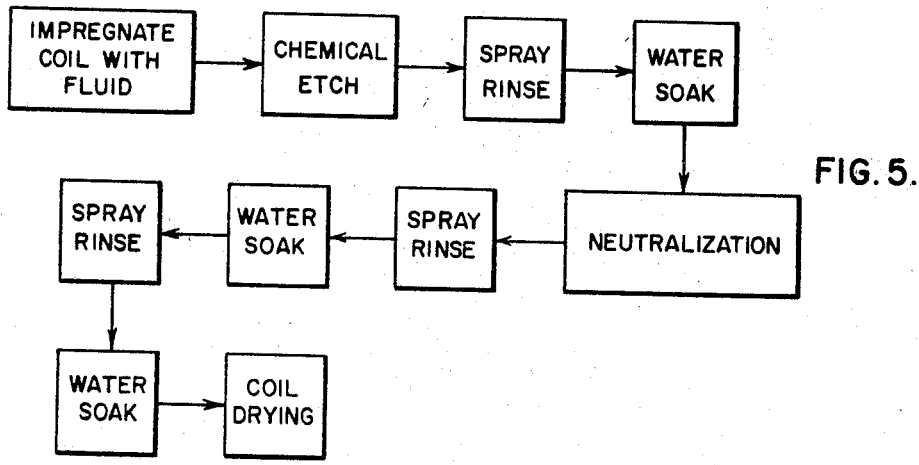

3,410,738
METHOD OF MAKING COILS OF ELECTRICAL CONDUCTORS

William S. Gorton, Jr., Cheektowaga, N.Y., assignor to Westinghouse Electric Corporation, Pittsburgh, Pa., a corporation of Pennsylvania
Filed Jan. 18, 1965, Ser. No. 426,312
6 Claims. (Cl. 156—3)

This invention relates generally to insulated or enameled electrical conductors and more particularly to insulated metal foil conductors and methods for preparing such conductors.

Conventional rectangular and round magnet wires, coated with a variety of thin resinous films, are generally known in the art as enameled magnetic wires. A wide variety of resins are employed to provide the thin resinous films on wire and the films or coatings generally have excellent physical, chemical and electrical properties, including high flexibility, thermal endurance, solvent resistance, abrasion resistance and electric strength as well as other specific desirable properties. The resinous films are tenaciously bound to the wire and may generally be subjected to rigorous winding operations and service conditions with little or no damage to insulating properties.

One disadvantage of conventional magnet wire is that a large amount of space is required for the turns and layers of the conventional wire. Many attempts have been made to provide an insulated conductor system with a more favorable space factor. Aluminum and copper in the form of thin foil or strip having a width equal to the width of a finished coil have been recognized as promising sources for improving the space factors of coiled or wound conductors. Thin foil or strip also provides other advantages in the fabrication and construction of electrical equipment, particularly electrical coils. When aluminum or copper foil strip is wound into a coil, for example, layer to layer voltage differences are eliminated. Only turn-to-turn insulation voltage differences remain and consequently the insulation may be of moderate but uniform electric strength. This electric strength may be provided by a relatively thin but uniform layer of insulation.

With varying degrees of success, thin conducting foil strips have been insulated with free self-supporting films of plastic, paper and the like. The free films are not an integral part of the conductor and are generally employed as an interleaf when the foil or strip is wound into a coil. The winding equipment is complex and the films must be relatively thick to provide a reliable insulating layer. In the case of aluminum foil, the foil surfaces have been anodized to provide an integral insulating film of aluminum oxide, but the oxide surface is brittle and imposes limitations on the handling and use of conductors so insulated. Electrical shorting between turns because of burrs on slit foil has also been a problem.

A desirable insulation for the foil conductors would be the thin resinous films heretofore employed on conventional magnetic wires. The resinous film could be easily and conveniently applied to foil or strip conductors from solutions of the resins which are subsequently cured to a solid flexible state at elevated temperatures. However, certain difficulties were encountered when foil conductors were so coated and cured. Because of the surface tension of the resinous solutions, there is a pronounced tendency for the wet resinous film to withdraw from the edges of the foil. Thus, the wet resinous film and consequently the cured insulating film at or on the edge is too thin and provides a much lower electric strength than the resinous film at the center of the conductor.

The withdrawal of the wet resinous film from the edge sometimes creates a thicker film or bead near the edge. A solid resinous bead is then present after the resin is cured to its solid flexible state. When the coated foil having the resin bead along the edge is rewound, the bead thickness is multiplied many times because of the many turns. The beads have caused processing problems. The problems associated with the thinly coated edges have seriously limited the development and use of resin insulated or enameled foil conductors. The presence of burrs on slit foil edges has also created problems in providing uniform reliable insulation on enameled foil conductors.

Accordingly, it is the general object of this invention to provide metallic foil conductors having a reliable uniformly deposited tightly adherent resinous insulating film.

An object of this invention is to provide foil conductors having a uniform and adequate electric strength throughout all of the areas of the foil conductors including the edges.

Another object of this invention is to provide a method for reliably and uniformly removing burrs from insulating coil conductors with resinous films.

Yet another object of this invention is to provide a convenient and reliable method for uniformly insulating slit edges of enameled foil conductors.

Briefly, the present invention accomplishes the above cited objects by coating a relatively wide metallic foil strip with a resinous enamel film, slitting the foil into one or more narrower conductor strips and then removing a portion of the metallic foil edge to eliminate burrs and at the same time provide protruding and protective resin film lips over the edge of the foil. The protruding lips provide a channel which may be filled with an insulating material to provide a positive uniform edge insulation.

Further objects and advantages of the invention will become apparent as the following description proceeds and features of novelty which characterize the invention will be pointed out in particularity in the claims annexed to and forming a part of this specification.

For a more complete understanding of this invention, reference may be had to the accompanying drawings, in which:

FIG. 3 is a series of enlarged partial sectional views illustrating the condition of the foil edge at various stages of treating the slit edge of an enameled metallic coil.

FIG. 5 is a flow diagram illustrating a batch process for coating and etching the exposed edges of the slit enameled metallic foil.

In accordance with the foregoing objects, it has now been discovered that the exposed edges of thin rectangular conductors that have been enameled and slit can be etched and sealed with a resinous deposit to provide satisfactory uniformly insulated strip conductors. The exposed edges of aluminum foil, for example, that has been enameled and slit can be satisfactorily sealed and uniformly insulated by removing enough aluminum from between the enamel layers to provide a groove or channel between the layers, introducing an insulating liquid resin into the groove to coat and/or seal the exposed edge and then curing the resin to its solid flexible state. The aluminum may be removed most conveniently by contacting the edges with chemical etchants which will dissolve the aluminum without adversely affecting the enameled film.

The chemical etching and the insulation of the exposed edges may be conducted continuously on a foil strip or it may be conducted in an especially reliable and convenient manner on wound coils.

Figure 1:
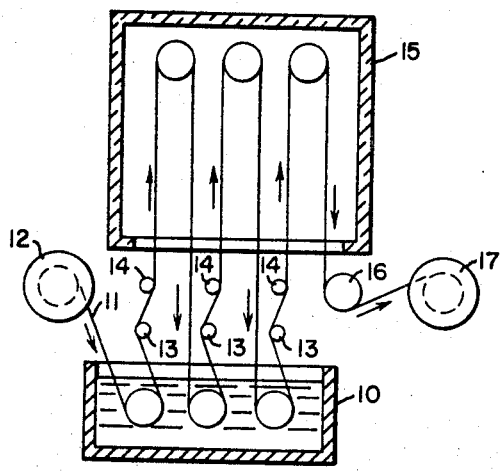
FIGURE 1 is an elevation, partially sectioned, illustrating the continuous coating or enameling of a coil of metallic foil.

In accordance with one aspect of the invention, a relatively wide strip of metal foil is first enameled or insulated by methods known in the art. Referring now to FIG. 1, we have illustrated an enameling tower suitable for the continuous coating of aluminum foil. A resinous enameling solution comprising a mixture or blend of epoxy and urea-form aldehyde resins is added to the pan 10. A one mil thick aluminum foil, 5½ inches wide is continuously payed off the reel 12 into the enameling solution so that a coating is applied to the foil. The coated foil emerges from the enameling solution and contacts a pair of grooved die pins 13, 14 which distribute the resinous coating on the foil, forcing the excess coating material back into the enameling pan. The coated foil passes through the vertical enamel baking tower 15 to cure the resinous coating to its solid flexible state. Three passes are made through the enamel pan and baking tower, each coat being baked before the next coating is applied. A resinous film about 0.0002 to 0.0003 inch in thickness is tenaciously bound to the aluminum foil. The cured enameled foil is drawn over the capstan 16 and wound onto the take-up reel 17. Examination of a cross-section of this foil under a microscope will disclose that the enamel coating tapers to an extremely thin coating at the foil edges. This enameled foil is slit to a width of about 4½ inches, an equal trim strip being removed from each edge so that the remaining foil is sandwiched between uniform films of insulation with the foil edges exposed.

Enamels which are suitable for use in this invention include heat-hardenable wire enamels which remain solid and flexible without softening at temperatures up to about 150° C. It is important that the cured enamel film be resistant to attack by the chemical etching solutions employed to remove the metal from between the insulating film at the exposed metallic edge. Where alkali or alkaline materials are employed to dissolve aluminum, for example, epoxy based wire enamel compositions may be used. The epoxy based enamels have exhibited an outstanding resistance to alkali and alkaline materials and acids and other chemicals as well. For example, a wire enamel composition comprising a mixture or blend of an epoxy resin and urea aldehyde or melamine aldehyde resin is especially suitable. Reference may be had to U.S. Patent 2,991,326, assigned to the assignee of this invention, for details and particulars on the preparation of such epoxy resin enamels. While the epoxy resin wire enamels are preferred, it should be understood that other enamels known in the art, e.g., polyester and polyvinyl acetal enamels, may be acceptable where the exposure to etch solutions is less vigorous.

As noted hereinabove in the description relating to the edge trimming or slitting operation, the enameled metal strip is slit at a location, inwardly from the edge, which will provide a foil conductor with a uniform film of insulation. It should be understood that if the enameled foil also has a heavier bead away from but near the edge, the strip should be slit at a location inwardly from said bead. In each instance, the outer portion of the enameled foil, which does not have a uniform coating, is discarded. It should be understood, of course, that a much wider metal foil may be enameled and that a plurality of narrower foil strip conductors may be simultaneously slit so that the discarded portion is limited to the extremities of the foil.

Trimming the edge to remove that portion of the strip which has the heavy bead and/or thin coating leaves an uninsulated and exposed edge. Even though the metal foil is sandwiched between insulating films, the exposed edge together with any slitting burrs makes such strip unsuitable for use in electrical equipment, as for example foil wound coils. In an electrical coil, the likelihood of electrical shorting between adjacent turns of such material would prohibit its use. Recoating or re-enameling the slit strip is not satisfactory because once again the surface tension of the enamel would cause a thin edge coating and/or a heavy bead near the edge. Burrs on the edges of th slit enameled foil are also sources of potential failure.

In accordance with this invention, the exposed edge of slit enameled foil is insulated or sealed with a relatively thick uniform coating of resinous material. An adequate film thickness is provided at the corners of the edge with no heavy bead near the edge of the strip. This is accomplished by removing a portion of the metal from the edge, including any burrs that may be present, so that the resinous films extend beyond the edge of the remaining metal foil. At this point, the conductor may be described as a metal foil strip sandwiched between flexible resinous insulating film with the insulating films projecting beyond the edge of the metal foil. The projecting resinous films and the base of the remaining metal foil form a channel or groove. If the insulating films are projected beyond the edge of the remaining metal foil for a distance greater than about ½ of the foil thickness, the conductor may be, first fabricated into electrical apparatus, such as winding into coils and filled with resin by impregnating or dipping into varnish solutions. Such coils could be suitable for low voltage applications. For higher voltages and for a more reliable low voltage product, the channel or groove will serve as a receptacle for liquid resinous insulating materials so that the exposed metal edge may be coated or sealed. No bead will be formed and the edge will be satisfactorily insulated.

Figure 2:
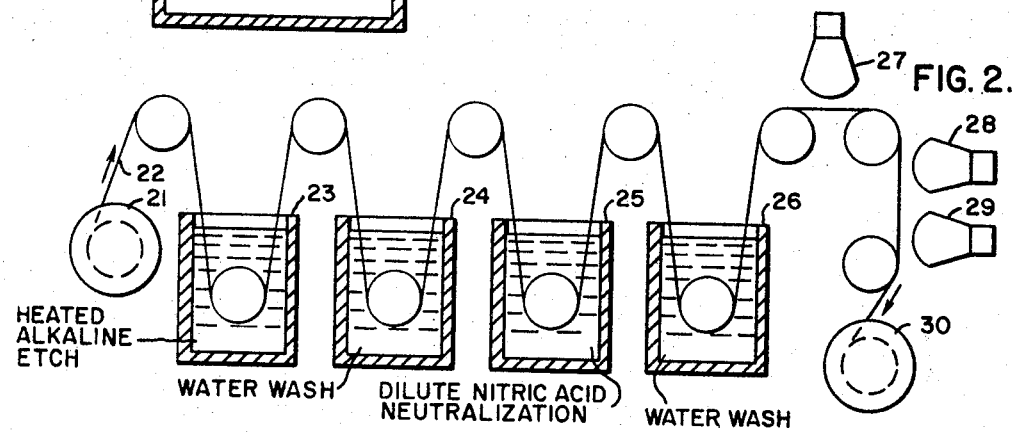
FIG. 2 is an elevation, partially sectioned, illustrating the continuous process for etching the exposed edges of the slit enameled metallic foil.

Referring now to FIG. 2, a roll of the slit enameled aluminum foil, with exposed edges, is placed on the pay-off reel 21. The foil 22 is unwound and continuously passed through the tanks 23, 24, 25 and 26. A heated alkaline etch solution, more particularly a 10% sodium hydroxide solution at 85° C., is placed in tank 23 and a sufficient number of passes is made to keep the foil immersed for about 1½ minutes. A depth of about 0.005 inch will be removed from each edge, together with any burrs that may be present, and the resinous enamel films will project beyond the foil by that distance. The edge-etched foil is then passed through a water bath in tank 24 to wash out the caustic etch solution and stop the etching action. The washed foil is then passed through a nitric acid solution in tank 25 to neutralize any remaining traces of the caustic etching reagent and an additional water wash in tank 26 to remove any traces of the nitric acid. The etched foil is wet as it emerges from the water wash and may be conveniently dried by a band of heat lamps 27, 28, 29 before being rewound into a coil on the take-up reel 30.

The insulation of the newly exposed edge within the groove or channel may be accomplished on the enameling apparatus illustrated in FIG. 1 and by the methods described in conjunction with that figure and equivalents thereto. The roll of edge etched foil may be placed on the pay-off reel and passed through the enameling tower to apply one additional coat of the epoxy base enamel in a single pass through the enameling pan and curing tower. The resinous enameling solution will be drawn into the edge groove or channel by capillary attraction. The resinous epoxy coating in the groove is cured to its solid flexible state, effectively sealing and insulating the foil edge. If desired, other known enameling solutions may be employed since the coating in the groove need not be exposed to chemical etchants.

In FIG. 3, the condition of the foil conductors in various steps or stages of the process is illustrated by cross-sections of the foil edge. Step A is an illustration of the foil conductor before treatment. In step B, the foil has been coated with a resinous enameling solution and the coating has been cured to its solid state. In step B, the very thin coating at the edge and the bead near the edge are apparent. It should be understood that in some instances the foil may be enameled without producing a bead, but that with the methods heretofore employed in the art, it was not possible to provide an adequate uniform coating on the edge or corner of foil conductors. After enameling, the foil is slit so that the bead and/or edge can be discarded and the insulating films and foil are coextensive as illustrated in step C. After etching away a portion of the foil edge, the insulating films will extend or project beyond the edge of the foil and form a channel or groove as illustrated in step D. The channel or edge groove may then be filled with a resinous insulating material to provide a final completely insulated foil conductor product as illustrated in step E.

It should be understood that steps A through D may be accomplished in a continuous manner by combining, in a single associated processing line, the equipment of FIGS. 1 and 2. The edge etched foil conductor, as illustrated in step D of FIG. 3, may be sold as a commercial product and the edge groove may be filled with a resinous insulating material by the user either before or after a coil, for example, is wound from such foil. The edge groove may be sealed or insulated when the completed coil is varnished or encapsulated in a resinous insulating material.

In the foregoing methods, the edge etching operations are conducted on an uncoiled metal foil strip. Those skilled in the art will recognize the desirability and advantages inherent in being able to etch, and provide a channel for a subsequent deposit of uniform insulation on the foil conductor edges, with the slit enameled foil in coil form. Less initial equipment, lower maintenance costs and a more reliable product are some of the advantages of the batch-wise process described below.

Figure 4:
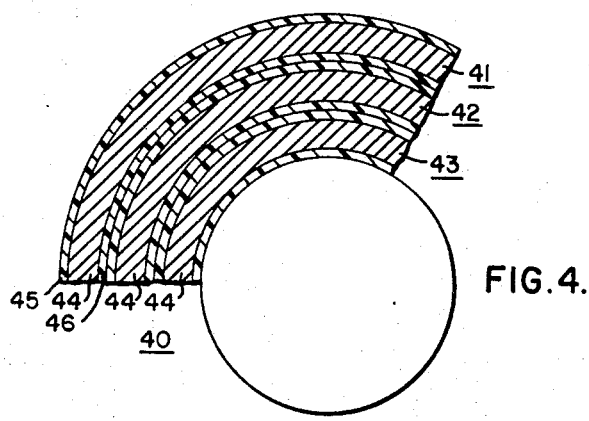
FIG. 4 is an enlarged perspective view of a wound coil illustrating a number of the turns of slit enameled foil.

A coil or a plurality of coils may, for example, be rewound in an essentially continuous manner during the slitting operation, stopping only to put new rolls on the slitting machine. One or more smaller coils of slit coated foil may be wound during the slitting operation by simply rewinding the slit foil onto small round coil forms. Treating such a wound coil would eliminate unrolling and re-rolling the foil. Referring now to FIG. 4, we have illustrated a portion of a coil 40 which has been rewound into a plurality of turns, for example 41, 42, 43 as the enameled or coated foil is slit in the slitting machine. Each turn is comprised of a foil conductor sandwiched between films of insulation. For example, the foil 44 and films 45, 46 make up the turn 41.

Those skilled in the art will recognize that the wound coil will have internal voids or interstices. When the coil is immersed or contacted with a liquid, there is tendency for the liquid to penetrate into the coil with the possibility that some of the liquid may be entrapped. This is, of course, desirable when the coil is immersed in varnish or the like in order to impregnate or encapsulate the coil with insulation. However, when the contacting liquid is a chemical etchant, sufficiently active to dissolve the metal foil, it is undesirable to have such liquids entrapped in the internal voids. Even if the insulation has the properties to permit contact therewith for etching the edges without degrading the insulation, continuous prolonged contact may eventually degrade the insulation. Moreover the etching liquids may leave residues which are electrically conductive and are sources of possible electrical shorts either within the coil or associated apparatus. It is apparent then that the retention of the liquid etching solution or dried residues is undesirable.

In accordance with another aspect of the invention, it has been discovered that coils wound from slit enameled foil may be etched and the exposed edges insulated by treating the wound coil itself. The retention of the chemical etching solution is avoided by first impregnating the coil with an inert, noncorrosive liquid. The inert liquid will penetrate the coil, filling some of the space between turns, so that the chemical etching reagent will contact the edges but will not penetrate the already filled spaces between turns. A liquid such as ordinary tap water, or preferably distilled water, is readily available and convenient to use as the inert noncorrosive liquid. The coil may be impregnated with distilled water at room temperature under a vacuum, i.e., at some pressure lower than atmospheric pressure, to insure a deep thorough penetration of the coil. This impregated coil may then be safely immersed in an etching solution to remove a portion of the exposed foil edge. With even greater advantage, the etching solution may be maintained at some temperature above the initial coil temperature so that the water in the spaces between turns will expand slightly and part of the water will flow or ooze out from the spaces between turns. This expansion and outward flow of inert fluid will prevent any significant penetration by the corrosive etching solution. Moreover, only a slight amount of the water will flow outwardly from the coil so that there is no interference with the action of the etching solution of the exposed metallic edge.

Referring now to FIG. 5 together with the following description, there is presented a specific example of a batchwise edge etching of slit enameled aluminum foil coils. FIG. 5 is a flow diagram. As will be apparent from that figure, the coil of slit enameled aluminum foil is placed in a vessel filled with a sufficient amount of distilled water to completely immerse the coil. A lid is placed on the vessel and a vacuum is drawn to a sufficiently reduced pressure to make the water boil. Evaporation of the water cools the remaining liquid water and the immersed coils. The vessel is opened to the atmosphere so that atmospheric pressure is applied to the vapor space above the water. The water-filled coil is suspended with the axis horizontal, to further reduce the possibility of entrapment of gases and immersed for 30 minutes in a 10% solution of sodium hydroxide at 40° C. The coil is removed from the sodium hydroxide solution, rinsed with a water spray and immersed and soaked in a rinse water bath, also at 40° C. or slightly above. The hot rinse water in the soaking bath is stirred until the etching reaction and the evolution of gases almost ceases. The washing cycle may be repeated to accomplish a more complete removal of the sodium hydroxide solution.

The washed coil is then immersed in a 1% nitric acid solution at 40° C. for 5 minutes to neutralize any remaining caustic further preventing the possibility of any caustic residue. Following the neutralization, the etched neutralized roll is again rinsed with a water spray and soaked in an agitated water bath. The spray rinse and soak is repeated and the final soak is preferably conducted in an appropriate vessel with distilled water, employing the same procedure described above for filling or impregnating the coil with distilled water. After the final soak, the edge-etched coil may be dried at 45 to 50° C. in a vacuum oven to remove the water and dry the coil, if desired.

It should be understood that the foregoing description may be varied in the number of cycles and the particular sequence of operation. For example, more than one vacuum-pressure cycle may be employed to fill the coil with distilled water, or, for example, the neutralization step may immediately follow the etching step. The essential advantages of this aspect of the invention are provide by filling the coil with water or other essentially inert non-corrosive liquid prior to the etching step.

It should also be understood that it is not essential to employ distilled water, although this is a preferred material. It will also be apparent to those skilled in the art that other materials and solutions may be employed, as for example alternative etching solutions in place of the specifically described sodium hydroxide. A solution of any strong alkali, particularly alkali metal hydroxides, or even acid solutions may be employed to etch the aluminum foil. Other etching solutions may be employed to etch other types of metallic foil. An appropriate neutralizing solution must, of course, be selected. With alkali-metal hydroxide etching solutions, it has been discovered that a dilute nitric acid solution is the preferred neutralizing medium because of the high solubility of the salts produced in the neutralizing reaction.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. A method of etching a coil of slit insulated coated metal strip conductor, the conductor being sandwiched between films of said insulation and having exposed metal edges comprising the steps of impregnating the coil with water to fill the interstices thereof, contacting the exposed metal edges with an aqueous chemical etchant to remove a portion of the metal and provide flaps of film which project beyond the metal edge, terminating the contact between the chemical etchant and the metal edge, removing the chemical etchant from the edge, neutralizing residues of the chemical etchant, washing the exposed edges and drying the coil.

2. A method of etchinng a coil of slit enamel coated aluminum foil conductors having exposed uninsulated edges comprising the steps of impregnating the coil with water at about room temperature and under a vacuum at reduced pressure to fill interstices therein, immersing the impregnated coil in an aqueous alkaline etch solution having a temperature above said room temperature for a sufficient time to etch away a portion of the foil at the exposed edge to form a channel defined by the enamel coating and foil, washing said coal with water to remove the etch solution, soaking said coil in water to further remove the etch solution, immersing said coil in a dilute solution of nitric acid to neutralize resides of etch solution, washing said coil with water to remove soluble salts formed in the neutralization, soaking the coil in distilled water to remove traces of the neutralized residue and acid and removing the water from the coil.

3. A method of forming an insulated aluminum foil conductor which includes:
passing a relatively wide aluminum foil sheet from a roll,
applying a coating of a liquid resinous insulating material to both sides of said sheet,
heating the coated sheet to cure the liquid material to a solid flexible state,
applying at least one additional coating of liquid resinous insulating material to both sides of the coated sheet and heating the sheet to cure the additional liquid material to a solid flexible state,
the edges of a sheet having a relatively thin coating of insulating material,
trimming said wide sheet inwardly from said edges to remove at least the portions having said thin coating and discarding said trimmed portions,
splitting the remainder of said wide sheet into a plurality of narrower strips,
each of said strips having exposed edges of aluminum, and forming a plurality of coils about an axis,
impregnating a coil with water to fill interstices therein,
immersing a wound coil of the strip in a chemical etching solution to remove a portion of aluminum foil from said exposed edge and provide a channel between the coatings of the foil, the immersed coil having its axis in a horizontal position,
washing the etched coil in water,
immersing the washed coil in a solution that will neutralize the etching solution and form a water soluble salt,
washing the neutralized coil in distilled water to remove the soluble salt formed in the neutralization and drying the washed coil.

4. The method of claim 3 wherein the chemical etching solution is a dilute sodium hydroxide solution and the neutralizing solution is a dilute nitric acid solution.

5. The method of claim 3 wherein a coil of edge-etched aluminum foil is encapsulated with an insulating material, the insulating material sealing said channel.

6. The method of claim 2 wherein the foil is wound about an axis to form the coil, the coil is impregnated with distilled water, the coil is immersed in the etch solution so that said axis is in a horizontal position and the water is removed from the coil by heating the coil in a chamber evacuated to a reduced pressure.

References Cited

UNITED STATES PATENTS

| 1,785,099 | 12/1930 | Sherts | 156—2 |
| 2,541,901 | 2/1951 | Zademach et al. | 156 23 |
| 3,211,571 | 10/1965 | Harris et al. | 117—49 |

FOREIGN PATENTS

| 94,019 | 3/1960 | Netherlands. |

JACOB H. STEINBERG, *Primary Examiner.*